United States Patent
Singleton et al.

(10) Patent No.: US 7,020,164 B1
(45) Date of Patent: Mar. 28, 2006

(54) SYSTEM AND METHOD FOR SPECIAL SIGNALING WITH CUSTOMER PREMISES EQUIPMENT

(75) Inventors: Gregory L. Singleton, Austin, TX (US); Andrew M. Spooner, Austin, TX (US); Ramona L. Boyd, Austin, TX (US); Jason F McCullough, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 49 days.

(21) Appl. No.: 10/318,751

(22) Filed: Dec. 13, 2002

Related U.S. Application Data

(63) Continuation of application No. 09/201,331, filed on Nov. 30, 1998, now Pat. No. 6,522,668.

(51) Int. Cl.
*H04J 1/00* (2006.01)
*H04J 1/02* (2006.01)
*H04M 11/00* (2006.01)

(52) U.S. Cl. .................... 370/480; 370/493; 379/90.01
(58) Field of Classification Search ............... 370/352, 370/355, 356, 357, 480, 493, 496; 379/90.01, 379/93.01, 142.01, 251, 352, 418, 900
See application file for complete search history.

(56) References Cited

U.S. PATENT DOCUMENTS

| | | | |
|---|---|---|---|
| 3,532,827 A | 10/1970 | Ewin ........................... | 179/18 |
| 3,821,484 A | 6/1974 | Stemung et al. ........ | 179/18 EB |
| 3,889,067 A * | 6/1975 | Reed et al. ................. | 379/250 |
| 4,002,849 A | 1/1977 | Kotler et al. ........... | 179/18 EB |
| 4,024,359 A * | 5/1977 | De Marco et al. ....... | 379/22.02 |
| 4,232,199 A | 11/1980 | Boatwright et al. ...... | 179/18 B |
| 4,282,408 A | 8/1981 | Stauers .................... | 179/18 FA |
| 4,438,511 A | 3/1984 | Baran | |
| 4,455,646 A | 6/1984 | Bloodworth | |
| 4,665,514 A | 5/1987 | Ching et al. | |
| 4,679,227 A | 7/1987 | Hughes-Hartogs ........... | 379/98 |
| 4,731,816 A | 3/1988 | Hughes-Hartogs ........... | 379/98 |

(Continued)

FOREIGN PATENT DOCUMENTS

JP  62084646  4/1987

(Continued)

OTHER PUBLICATIONS

Horst Hessenmüller, et al., Zugangsnetzstrukturen für interaktive Videodienste (Teil 1), *Fernmelde Ingenieur, Der*, vol. 48, No. 8, XP000647017, Aug., 1994, Germany, pp. 1-32 (with English translation).

(Continued)

*Primary Examiner*—Hassan Kizou
*Assistant Examiner*—Hong Sol Cho
(74) *Attorney, Agent, or Firm*—Baker Botts L.L.P.

(57) ABSTRACT

A system and method are provided for special signaling with customer premises equipment. The system includes loop termination equipment coupled to a local loop and comprising a signal generator. The system also includes customer premises equipment coupled to the local loop. The customer premises equipment and loop termination equipment are operable to communicate across a communication link established on the local loop. The loop termination equipment is further operable to control characteristics of a signal generated by the signal generator and to provide the signal to the customer premises equipment as special signaling where the signal has a frequency that does not substantially interfere with voice traffic on the local loop. The special signaling can be used to implement enhanced service to the customer premises including busy signal, queued data request processing, push data and telephony services.

11 Claims, 4 Drawing Sheets

U.S. PATENT DOCUMENTS

| | | | | |
|---|---|---|---|---|
| 4,740,967 A | * | 4/1988 | Georgalis | 370/295 |
| 4,757,495 A | | 7/1988 | Decker et al. | |
| 4,782,512 A | | 11/1988 | Hutton | 379/98 |
| 4,803,720 A | | 2/1989 | Newell et al. | 379/202 |
| 4,833,706 A | | 5/1989 | Hughes-Hartogs | 379/98 |
| 4,841,561 A | | 6/1989 | Hill | 379/97 |
| 4,924,511 A | * | 5/1990 | Burns et al. | 379/418 |
| 4,949,355 A | | 8/1990 | Dyke et al. | 375/10 |
| 4,980,897 A | | 12/1990 | Decker et al. | 375/38 |
| 5,001,748 A | * | 3/1991 | Burns et al. | 379/418 |
| 5,025,469 A | | 6/1991 | Bingham | 379/98 |
| 5,054,034 A | | 10/1991 | Hughes-Hartogs | 375/8 |
| 5,119,402 A | | 6/1992 | Ginzburg et al. | 375/17 |
| 5,134,611 A | | 7/1992 | Steinka et al. | |
| 5,185,763 A | | 2/1993 | Krishnan | 375/39 |
| 5,198,818 A | | 3/1993 | Samueli et al. | 341/144 |
| 5,199,071 A | | 3/1993 | Abe et al. | 379/38 |
| 5,202,884 A | | 4/1993 | Close et al. | |
| 5,206,886 A | | 4/1993 | Bingham | 375/97 |
| 5,214,650 A | | 5/1993 | Renner et al. | |
| 5,222,077 A | | 6/1993 | Krishnan | 379/39 |
| 5,228,062 A | | 7/1993 | Bingham | 375/97 |
| 5,247,347 A | | 9/1993 | Litteral et al. | 358/85 |
| 5,282,155 A | | 1/1994 | Jones | 364/724.19 |
| 5,285,474 A | | 2/1994 | Chow et al. | 375/13 |
| 5,293,402 A | | 3/1994 | Crespo et al. | 375/14 |
| 5,295,159 A | | 3/1994 | Kerpez | 375/38 |
| 5,331,670 A | | 7/1994 | Sorbara et al. | 375/111 |
| 5,337,348 A | | 8/1994 | Yamazaki et al. | 379/94 |
| 5,339,355 A | | 8/1994 | Mori et al. | 379/94 |
| 5,341,474 A | | 8/1994 | Gelman et al. | 395/200 |
| 5,345,437 A | | 9/1994 | Ogawa | |
| 5,367,540 A | | 11/1994 | Kakuishi et al. | 375/103 |
| 5,371,532 A | | 12/1994 | Gelman et al. | 348/7 |
| 5,379,441 A | | 1/1995 | Watanabe et al. | 395/800 |
| 5,390,239 A | | 2/1995 | Morris et al. | 379/93 |
| 5,400,322 A | | 3/1995 | Hunt et al. | |
| 5,404,388 A | | 4/1995 | Eu | 379/24 |
| 5,408,260 A | | 4/1995 | Arnon | 348/6 |
| 5,408,522 A | | 4/1995 | Ikehata et al. | 379/98 |
| 5,408,527 A | | 4/1995 | Tsutsu | 379/211 |
| 5,408,614 A | | 4/1995 | Thornton et al. | 395/275 |
| 5,410,264 A | | 4/1995 | Lechleider | 327/311 |
| 5,410,343 A | | 4/1995 | Coddington et al. | 348/7 |
| 5,412,660 A | | 5/1995 | Chen et al. | |
| 5,414,455 A | | 5/1995 | Hooper et al. | 348/7 |
| 5,414,733 A | | 5/1995 | Turner | 375/233 |
| 5,422,876 A | | 6/1995 | Turudic | |
| 5,479,447 A | | 12/1995 | Chow et al. | 375/260 |
| 5,495,483 A | | 2/1996 | Grube et al. | |
| 5,504,736 A | | 4/1996 | Cubbison, Jr. | |
| 5,504,753 A | | 4/1996 | Renger et al. | 371/20.1 |
| 5,506,868 A | | 4/1996 | Cox et al. | 375/222 |
| 5,513,251 A | | 4/1996 | Rochkind et al. | 379/93 |
| 5,528,585 A | | 6/1996 | Cooley et al. | |
| 5,546,379 A | | 8/1996 | Thaweethai et al. | |
| 5,553,135 A | | 9/1996 | Xing | 379/399 |
| 5,555,244 A | | 9/1996 | Gupta et al. | |
| 5,574,724 A | | 11/1996 | Bales et al. | |
| 5,583,872 A | | 12/1996 | Albrecht et al. | 370/476 |
| 5,594,727 A | | 1/1997 | Kolbenson et al. | 370/442 |
| 5,594,732 A | | 1/1997 | Bell et al. | 370/401 |
| 5,598,406 A | | 1/1997 | Albrecht et al. | 370/296 |
| 5,600,712 A | | 2/1997 | Hanson et al. | 379/142 |
| 5,602,902 A | | 2/1997 | Satterlund et al. | 379/59 |
| 5,631,897 A | | 5/1997 | Pacheco et al. | 370/237 |
| 5,649,001 A | | 7/1997 | Thomas et al. | 379/93.07 |
| 5,659,542 A | | 8/1997 | Bell et al. | 370/496 |
| 5,668,857 A | * | 9/1997 | McHale | 379/93.07 |
| 5,678,004 A | | 10/1997 | Thaweethai | 595/187.01 |
| 5,687,176 A | | 11/1997 | Wisniewski et al. | 370/476 |
| 5,737,094 A | * | 4/1998 | Hui | 358/442 |
| 5,737,364 A | | 4/1998 | Cohen et al. | 375/220 |
| 5,756,280 A | | 5/1998 | Soora et al. | 455/4.2 |
| 5,770,950 A | | 6/1998 | Zurcher et al. | 326/30 |
| 5,771,279 A | * | 6/1998 | Cheston et al. | 379/93.17 |
| 5,781,617 A | | 7/1998 | McHale et al. | 379/93.14 |
| 5,799,017 A | | 8/1998 | Gupta et al. | 370/419 |
| 5,809,422 A | | 9/1998 | Raleigh et al. | 455/449 |
| 5,812,649 A | * | 9/1998 | Shen | 379/142.14 |
| 5,812,786 A | | 9/1998 | Seazholtz et al. | 395/200.63 |
| 5,838,683 A | | 11/1998 | Corley et al. | 370/408 |
| 5,852,655 A | * | 12/1998 | McHale et al. | 379/93.14 |
| 6,002,671 A | * | 12/1999 | Kahkoska et al. | 370/248 |
| 6,052,439 A | * | 4/2000 | Gerszberg et al. | 379/88.01 |
| 6,069,949 A | * | 5/2000 | Schuenhoff et al. | 379/242 |
| 6,075,784 A | * | 6/2000 | Frankel et al. | 370/356 |
| 6,081,517 A | | 6/2000 | Liu et al. | 370/352 |
| 6,084,881 A | * | 7/2000 | Fosmark et al. | 370/397 |
| 6,112,245 A | * | 8/2000 | Araujo et al. | 709/228 |
| 6,130,879 A | * | 10/2000 | Liu | 370/230 |
| 6,163,579 A | * | 12/2000 | Harrington et al. | 375/257 |
| 6,188,669 B1 | * | 2/2001 | Bellenger | 370/230 |
| 6,192,109 B1 | * | 2/2001 | Amrany et al. | 379/30 |
| 6,208,726 B1 | * | 3/2001 | Bansal et al. | 379/208.01 |
| 6,263,048 B1 | * | 7/2001 | Nelson et al. | 379/27.03 |
| 6,304,578 B1 | * | 10/2001 | Fluss | 370/413 |
| 6,320,867 B1 | * | 11/2001 | Bellenger et al. | 370/420 |
| 6,349,096 B1 | * | 2/2002 | Liu et al. | 370/352 |
| 6,389,062 B1 | * | 5/2002 | Wu | 375/222 |
| 6,487,197 B1 | * | 11/2002 | Elliott | 370/354 |
| 6,826,280 B1 | * | 11/2004 | Sajadi et al. | 379/413.04 |
| 2003/0204756 A1 | * | 10/2003 | Ransom et al. | 713/300 |

FOREIGN PATENT DOCUMENTS

| | | |
|---|---|---|
| JP | 62222755 | 9/1987 |
| JP | 6376648 | 4/1988 |
| JP | 02271763 | 11/1990 |
| JP | 04100367 | 4/1992 |
| WO | WO 97/37458 | 10/1997 |

OTHER PUBLICATIONS

Horst Hessenmüller, et al., Zugangsnetzstrukturen für interaktive Videodienste (Teil 2), *Fernmelde-Ingenieur,* vol. 48, No. 9, XP000619688, Sep., 1994, Germany, pp. 1-28 (with English translation).

* cited by examiner

SYSTEM AND METHOD FOR SPECIAL SIGNALING WITH CUSTOMER PREMISES EQUIPMENT

CROSS REFERENCE TO RELATED APPLICATION

This application is a continuation of U.S. patent application Ser. No. 09/201,331 filed Nov. 30, 1998 and entitled "System and Method for Special Signaling With Customer Premises Equipment" now U.S. Pat. No. 6,522,668.

TECHNICAL FIELD OF THE INVENTION

This invention relates in general to electronic communications, to a system and method for special signaling with customer premises equipment (CPE) and, in particular, such a system and method for use in digital subscriber line (xDSL) communication.

BACKGROUND OF THE INVENTION

Digital subscriber line (xDSL) communication can provide a high bandwidth data path supported by the twisted pair wiring infrastructure of the public switch telephone network (PSTN). xDSL technology supports data service simultaneously with traditional telephone service using a separation technique. Suitable xDSL technologies include asymmetric digital subscriber line (ADSL), rate adaptable digital subscriber line (RADSL), symmetric digital subscriber line (SDSL), high speed digital subscriber line (HDSL), very high speed digital subscriber line (VDSL) and other such digital subscriber line technologies.

In general, an xDSL communication link can be established across the local loop between customer premises equipment (CPE) and a local loop termination point (e.g., central office or remote terminal). The local loop termination point typically includes an xDSL access multiplexer (DSLAM) which handles the xDSL link on the network side. The customer premises equipment typically includes one or more xDSL termination units (XTUs) which handle the xDSL link on the customer premises side. One architecture for xDSL communication is disclosed in U.S. Pat. No. 5,668,857, entitled "Communication Server Apparatus and Method."

In the system disclosed in U.S. Pat. No. 5,668,857, for example, it can be important for the customer premises equipment to signal the DSLAM when the customer premises equipment desires a connection to a termination unit (e.g., modem) within the available pool of units. In response, the DSLAM needs to have a means for providing a special signal back to the customer premises equipment which does not interfere with ongoing voice traffic.

SUMMARY OF THE INVENTION

In accordance with the present invention, a system and method are provided for special signaling with customer premises equipment that provide advantages over prior signaling schemes.

In accordance with one aspect of the present invention, a system and method provide special signaling with customer premises equipment. The system includes loop termination equipment coupled to a local loop and comprising a signal generator. The system also includes customer premises equipment coupled to the local loop. The customer premises equipment and loop termination equipment are operable to communicate across a communication link established on the local loop. The loop termination equipment is further operable to control characteristics of a signal generated by the signal generator and to provide the signal to the customer premises equipment as special signaling where the signal has a frequency that does not substantially interfere with voice traffic on the local loop. The special signaling can be used to implement enhanced service to the customer premises including busy signal, queued data request processing, push data and telephony services.

A technical advantage of the present invention is the ability to provide special signaling between the loop termination point and the customer premises equipment by generating and transmitting variable signals.

Another technical advantage of the present invention is an ability to implement request for service signaling from customer premises equipment to the loop termination point. Further, pending requests for service can be provided special status for access to resources at the loop termination point.

An additional technical advantage of the present invention is an ability to implement network initiated push data and telephony services to customer premises equipment.

Other technical advantages of the present invention should be apparent to one of ordinary skill in the art in view of the drawings, specifications and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
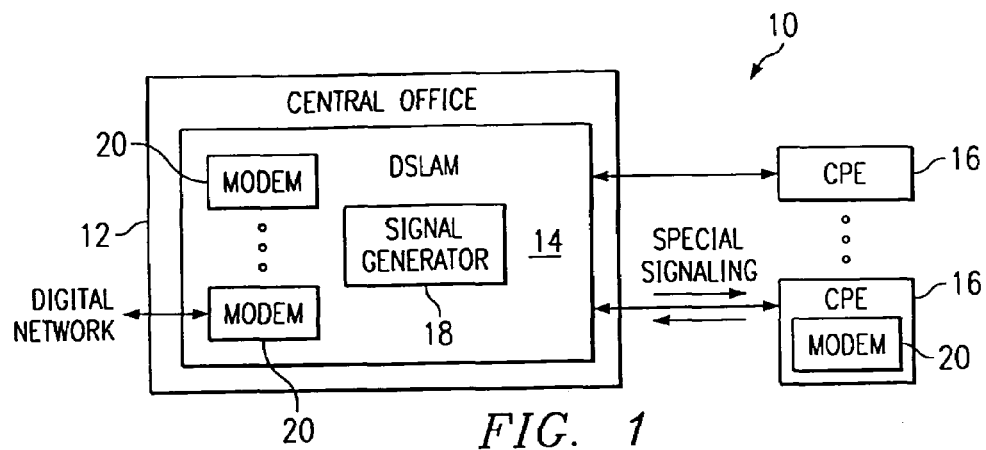
FIG. 1 is a block diagram of one embodiment of a digital subscriber line communication system allowing special signaling with customer premises equipment.

FIG. 1 is a block diagram of one embodiment of a digital subscriber line (xDSL) communication system allowing special signaling with customer premises equipment. As shown, a central office 12, or other loop termination point, can comprise a digital subscriber line access multiplexer (DSLAM) 14 as installed loop termination equipment. The DSLAM 14 can provide digital subscriber line (xDSL) service to a plurality of customer premises having customer premises equipment 16. The DSLAM 14 also provides a network access point for customer premises equipment 16 to a digital network such as the asynchronous transfer mode (ATM) cloud of the PSTN or the internet. For example, one communication system for establishing digital subscriber line service is disclosed and described in U.S. Pat. No. 5,668,857 entitled "Communication Server Apparatus and Method." In the embodiment of FIG. 1, DSLAM 14 comprises a signal generator 18 for special signaling and xDSL modems 20 (xDSL termination units—XTUs) for establishing a connection to customer premises equipment 16 and to the digital network. As shown, customer premises equipment 16 also comprises an xDSL modem 20 (XTU) for establishing a connection to DSLAM 14.

In operation, signal generator 18 can generate a variable signal under the control of DSLAM 14. In the embodiment of FIG. 1, the variable signal can be a high frequency signal that avoids interference with voice band traffic over the local loop connection. The variable signal can have a number of distinguishing characteristics including frequency, amplitude and pattern. Such distinctions allow the generated signals to be used for providing special signaling between DSLAM 14 and customer premises equipment 16. For example, a particular customer premises equipment 16 can signal DSLAM 14 that it desires an xDSL connection. If no resources are available, DSLAM 14 can then use signal generator 18 to send a busy signal indicating that no termination units are available. Alternately, DSLAM 14 can respond by connecting the customer premises equipment 16 to an available termination unit. It should be understood that various other special signaling schemes can be implemented using control of signal generators in loop termination equipment, such as DSLAM 14. In addition to an xDSL communication system, such special signaling could benefit other communications schemes including analog modem and ISDN connections.

Figure 2:
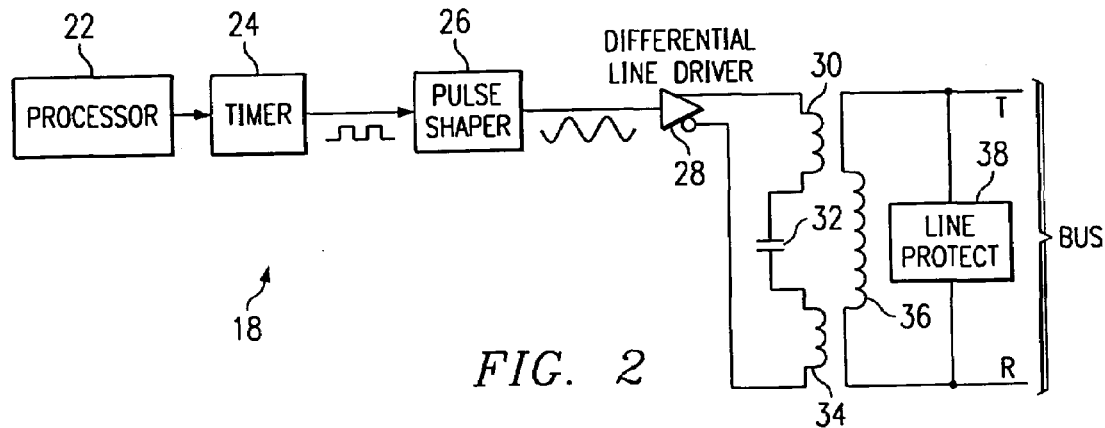
FIG. 2 is a block diagram of one embodiment of a signal generator for special signaling.

FIG. 2 is a block diagram of one embodiment of a signal generator 18 for special signaling. As shown, signal generator 18 comprises a processor 22. Processor 22 can execute code that implements a control process for providing a signal to a timer 24. For example, timer 24 can be a voltage controlled timer circuit which provides a square wave output with a frequency based upon an input voltage. By controlling the input voltage, processor 22 can control the frequency of the output of timer 24. The control process executed by processor 22 can thus vary the frequency of the output based upon the desired special signaling. Of course, other variations in the signal, such as amplitude or signal pattern, could also be implemented. Further, a device could be implemented to control frequency, amplitude or pattern in hardware.

In the embodiment of FIG. 2, the output of timer 24 is provided to a pulse shaper circuit 26. The pulse shaper circuit, for example, can be an active bandpass filter which converts the square wave output of timer 24 into a sine wave. Thus, in the case of FIG. 2, the output of pulse shaper 26 can be a signal tone having a frequency set by the frequency of the signal from timer 24. In FIG. 2, the output of pulse shaper 26 is connected to a differential line driver 28. Differential line driver 28 operates to drive the signal into an inductor 30, a capacitor 32 and an inductor 34 all connected in series. Inductor 30 and inductor 34, together with an inductor 36, form a transformer. Capacitor 32 blocks the DC path to prevent differential line driver 28 from overheating. Thus, in the circuit of FIG. 2, these devices provide a transformer coupling to the tip and ring wires. The tip and ring wires, for example, can be part of a bus within DSLAM 14 or can be within customer premises equipment 16. The tip and ring wires are protected by line protection circuitry 38 which prevent damage from power or other types of surges across the bus. Further, the AC coupling prevents damage from DC feedback in signal generator 18.

In operation, signal generator 18 of FIG. 2 can be used within loop termination equipment and customer premises equipment to provide special signals across the local loop. In one implementation, such signals are out-of-band signals that do not interfere with concurrent voice band traffic on the local loop. At either end of the local loop, the output of signal generator 18 can be set, and signal generator 18 can be connected to an appropriate twisted pair line. In the case of DSLAM 14 of FIG. 1, signal generator 18 can be connected to a specified xDSL termination units across a backplane of DSLAM 14. Then, the termination unit can send the special signal out to customer premises equipment 16.

It is a technical advantage of signal generator 18 that processor 22 can control characteristics of the generated signal to provide for variable output signals. This controlled variability allows signal generator 18 to enable the delivery of different types of special signals that can then be interpreted differently at the customer premises or loop termination point. Consequently, a signal generator 18 can be used to implement various beneficial service scenarios using the special signaling to indicate states at the customer premises or loop termination point.

Figure 3:
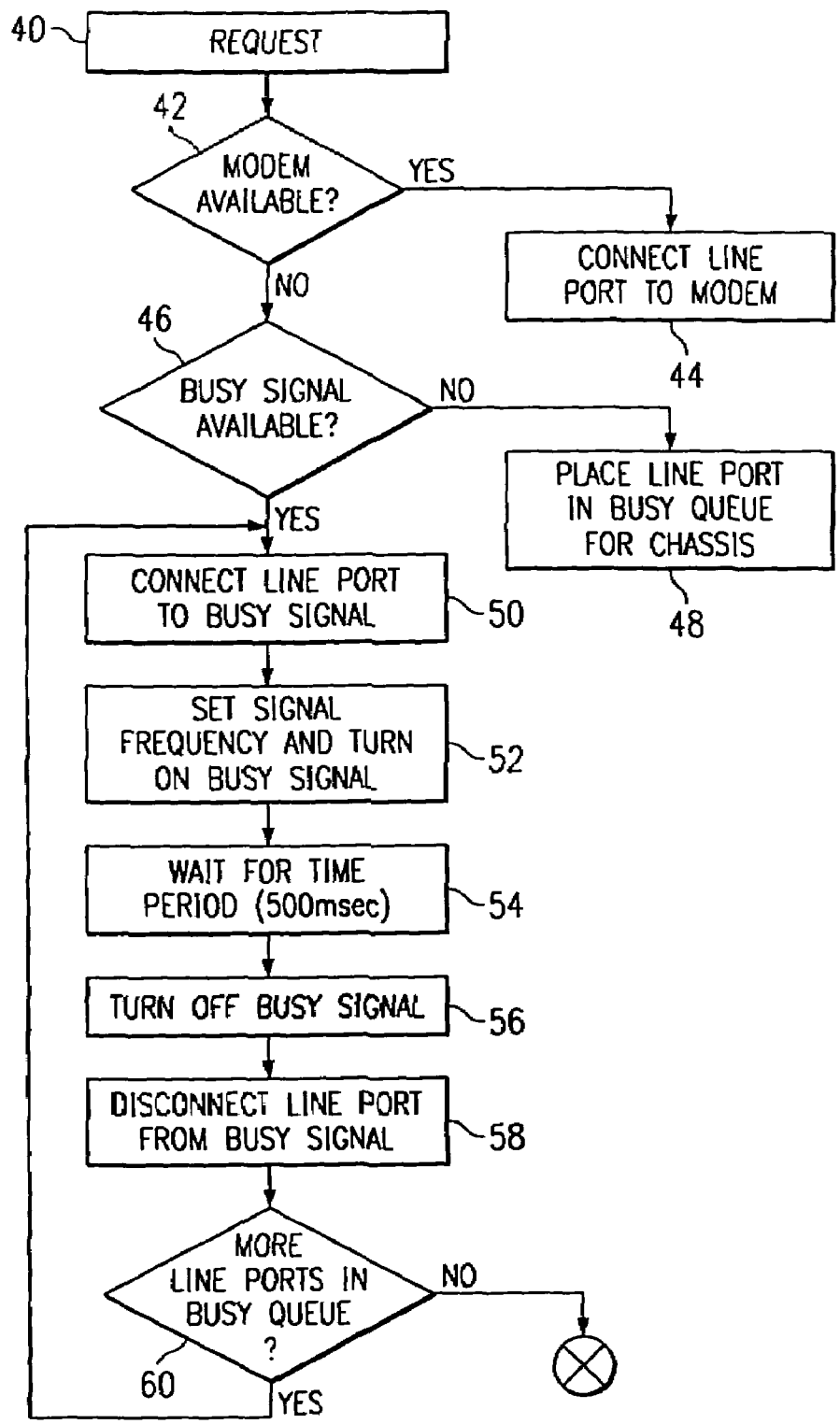
FIG. 3 is a flow chart of one embodiment of a process for providing a busy signal to customer premises equipment.

FIG. 3 is a flow chart of one embodiment of a process for providing a busy signal to customer premises equipment. In general, the process of FIG. 3 is based upon an architecture, like that of FIG. 1, where a DSLAM receives a request from customer premises equipment and responds to that request. Although the embodiment of FIG. 3 is in the context of an xDSL communication system like that of FIG. 1, it should be understood that the benefits of the special signaling apply to other communication architectures as well. Thus, FIG. 3 is only one example of a service provided using special signaling between the customer premises and the loop termination point.

In the embodiment of FIG. 3, customer premises equipment sends a request, in step 40, for digital subscriber line (xDSL) service from a DSLAM. After receiving the request, in step 42, the DSLAM determines whether an xDSL modem is available to service the request. If so, in step 44, the DSLAM connects a line port associated with the requesting customer premises to the available modem.

If, in step 42, a modem is not available, the DSLAM determines, in step 46, whether a busy signal is available. In this implementation, the busy signal is available if the signal generator circuit for the DSLAM chassis is not currently connected to another modem line port for signaling other customer premises. If a busy signal is not available, the DSLAM moves to step 48 and places the line port associated with the customer premises in a busy queue for that DSLAM chassis.

If a busy signal is available, the DSLAM moves to step 50 and connects the line port to the signal generator. Then, in step 52, the DSLAM sets the signal frequency for the signal generator and turns on generation of the busy signal. It should be understood, as mentioned above, that other characteristics could be controlled in addition to the frequency of the signal. In step 54, the DSLAM waits to allow the customer premises to see the signal for a defined time period. For example, the time period can be 500 milliseconds or one-half of a second. The associated customer premises equipment is designed to interpret the frequency of the signal transmitted for the defined period of time as a busy signal from the DSLAM indicating that the DSLAM does not have an available modem. After the defined time period, the DSLAM turns off generation of the busy signal in step 56. The DSLAM then disconnects the line port from the busy signal generator in step 58.

In step 60, the DSLAM determines whether there are more line ports in the busy queue. If not, the processing of requests can be initiated again by receipt of a request from a customer premises. If there are more line ports in the queue, the DSLAM moves to step 50 and connects line ports from the busy queue to the signal generator. Processing then continues at step 52 as described above.

Figure 4:
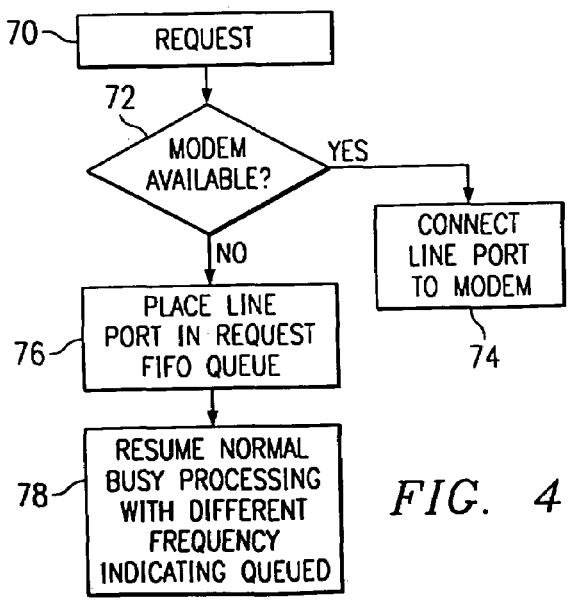
FIG. 4 is a flow chart of one embodiment of a process for line port connection sequencing for queued requests from customer premises equipment.

FIG. 4 is a flow chart of one embodiment of a process for line port connection sequencing for queued requests from customer premises equipment. As with FIG. 3, FIG. 4 is based upon an architecture, like that of FIG. 1, where a DSLAM receives a request from customer premises equipment and responds to that request. It should again be understood that the benefits of special signaling can apply to other communication architectures as well.

As shown in step 70 of FIG. 4, a DSLAM can receive a request for xDSL service from customer premises equipment. Then, in step 72, the DSLAM determines whether a modem is available. If so, the DSLAM moves to step 74 and connects the line port associated with the requesting customer premises to the available modem. This is the same as the process shown in FIG. 3. The difference in FIG. 4 is that, if a modem is not available, the DSLAM moves to step 76 and places the line port in a request first-in-first-out (FIFO) queue. This placement in the request queue gives the requesting customer premises equipment priority over customer premises equipment that issue later requests. After placing the request in the request queue, the DSLAM moves to step 78 and continues normal busy processing beginning, for example, at step 46 of FIG. 3. A different signal frequency will be set (e.g., in step 52 of FIG. 3) indicating to the customer premises equipment that it has been placed in the request queue. This means that the requesting customer premises equipment can stand by for service rather than being forced to repeat requests to the DSLAM for service.

Figure 5:
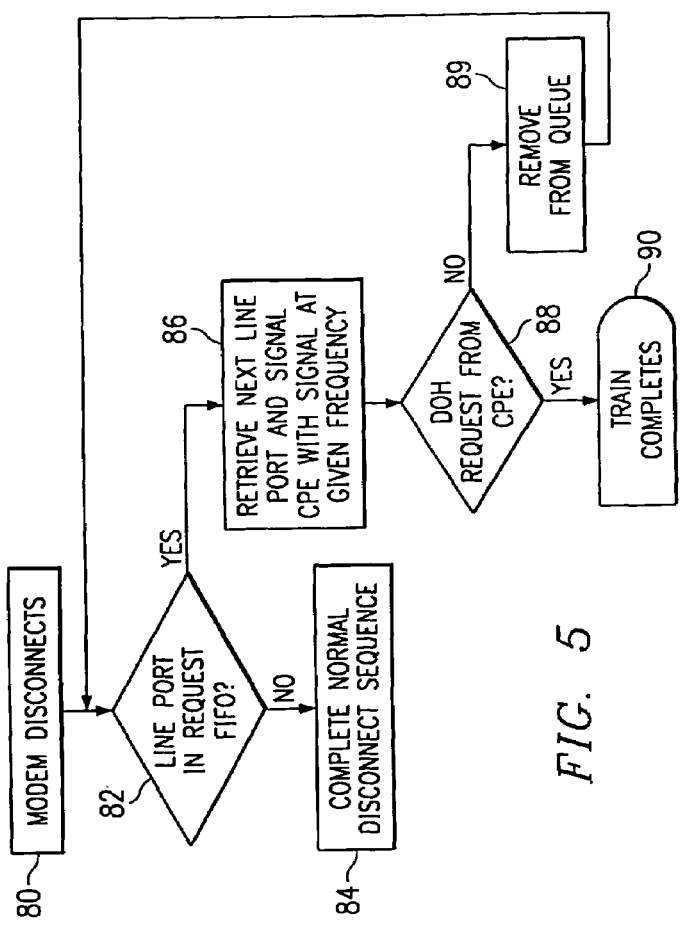
FIG. 5 is a flow chart of one embodiment of a process for a disconnection sequence for queued requests from customer premises equipment.

FIG. 5 is a flow chart of one embodiment of a process for a disconnection sequence for queued requests from customer premises equipment. Again, this process is shown in the context of, but is not intended to be limited to, an environment like that of FIG. 1. As shown in step 80 of FIG. 5, one of the modems within the DSLAM becomes available when it disconnects from a current customer premises. Then, in step 82, the DSLAM determines whether a line port is in the request queue. (For example, this line port could have been placed in the queue based upon the process of FIG. 4.) If there are no line ports in the request queue, then the DSLAM completes the normal disconnect sequence in step 84. The newly available modem can then be connected to the next requesting customer.

If a line port is in the request queue, the DSLAM moves to step 86 and retrieves the next line port from the queue. The DSLAM also signals the customer premises equipment with a signal at a given frequency to inform the customer premises equipment that it is now able to connect to an available modem. As mentioned above, the special signal could have other distinguishing characteristics instead of or in addition to frequency. In step 88, the DSLAM waits for a digital-off-hook (DOH) request from the customer premises equipment. If no DOH request is received, the DSLAM, in step 89, removes the customer premises equipment from the queue, and returns to step 82 to determine whether there are more line ports in the request queue. After receiving the DOH request from the customer premises equipment, the DSLAM completes training with the customer premises equipment in step 90.

The ability to provide special signaling to customer premises equipment allows service to be provided such that a customer is guaranteed the next modem available in the order that requests are received. This is a benefit over a system in which requests are simply serviced when received which may provide a modem more quickly to a later issued request.

Figure 6:
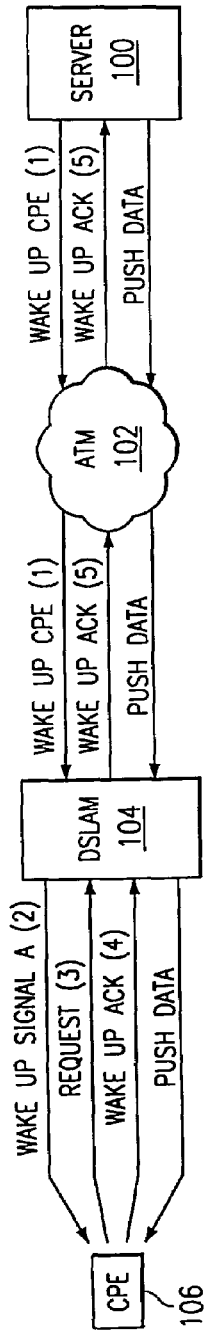
FIG. 6 is a block diagram of one embodiment of a network initiated connection for a push data service.

FIG. 6 is a block diagram of one embodiment of a network initiated connection for a push data service. This scheme uses special signaling for waking up the customer premises equipment to create a connection for receiving the push data. As shown, the system comprises a server 100 which can communicate through an asynchronous transfer mode (ATM) cloud 102 to a DSLAM 104. DSLAM 104 is in turn connected to customer premises equipment 106. In this system, server 100 desires to push data to customer premises equipment 106. For example, this scheme could be an internet news service that provides data to customer premises equipment 106. However, in order to send the push date, there needs to be an active connection between customer premises equipment 106 and DSLAM 104. In conventional operations, this connection is initiated at the customer premises and not from the network.

In the embodiment of FIG. 6, server 100 can send a wake up customer premises equipment signal to DSLAM 104 through asynchronous transfer mode cloud 102. This signal indicates that server 100 wants to push data to customer premises equipment 106. DSLAM 104 can respond by sending a special wake up signal to customer premises equipment 106. The wake up signal, for example, can be an out-of-band signal generated as discussed above. As shown, customer premises equipment 106 can respond to the wake up signal by issuing a request to DSLAM 104 for service to establish an xDSL connection. Customer premises equipment 106 can then respond by sending a wake up acknowledge signal (which could be an xDSL ACK) to DSLAM 104 across the newly initiated connection. DSLAM 104 can forward the wake up acknowledge signal back through asynchronous transfer mode cloud 102 to server 100. In response to the wake up acknowledge signal, server 100 can begin pushing data back through asynchronous transfer mode cloud 102 to DSLAM 104. In turn, DSLAM 104 can push data to customer premises equipment 106 over the recently initiated xDSL connection. Thus, this scheme allows transfer of push data across a connection initiated from server 100 as opposed to customer premises equipment 106. Further, it should be understood that this push scheme can be used with other types of connections across the local loop, including analog modem and ISDN connections.

Figure 7:
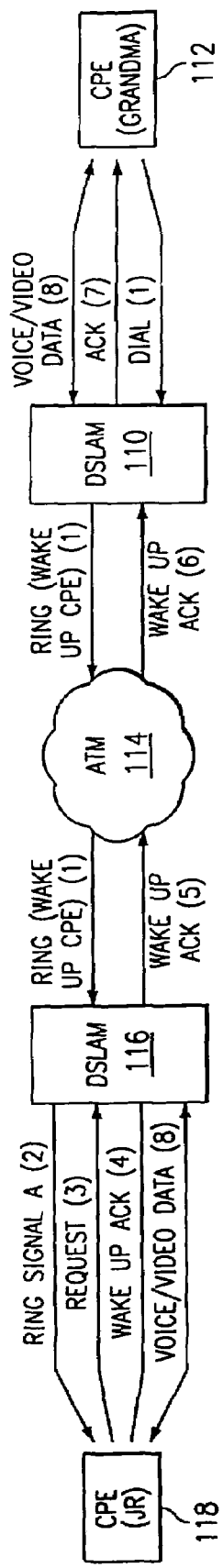
FIG. 7 is a block diagram of one embodiment of a network initiated connection for telephony service.

FIG. 7 is a block diagram of one embodiment of a network initiated connection for telephony service. In this embodiment, a first DSLAM 110 services customer premises equipment 112 (e.g., Grandma). DSLAM 110 can communicate through asynchronous transfer mode cloud 114 to a second DSLAM 116. DSLAM 116 can, in turn, service a second customer premises equipment 118 (e.g., Jr.). In this system, there can be a desire to place a telephony call from customer premises equipment 112 to customer premises equipment 118. For example, this could be an internet protocol (IP) telephony call across asynchronous transfer mode cloud 114. However, in order to make the call, there needs to be an active connection between customer premises equipment 118 and DSLAM 116. In conventional operations, this connection is initiated from the customer premises and not from the network.

In FIG. 7, DSLAM 110 and DSLAM 116 can communicate respectively with customer premises equipment 112 and customer premises equipment 118 using special signaling, for example as described above. This special signaling can be used to implement an internet protocol telephony service between the two end points. For example, customer premises equipment 112 can initiate a call by providing a special dial signal to DSLAM 110. DSLAM 110 can, in turn, send a special ring signal (e.g., wake up customer premises equipment signal) through asynchronous transfer mode cloud 114 to DSLAM 116. DSLAM 116 can then provide special signaling to customer premises equipment 118 to indicate a ring signal. Customer premises equipment 118 responds to the ring signal by sending a request to DSLAM 16 for service. Customer premises equipment 118 than sends a wake up acknowledge signal (which could be an xDSL ACK) across the newly established xDSL connection. DSLAM 116 forwards a wake up acknowledge signal back through asynchronous transfer mode cloud 114 to DSLAM 110. DSLAM 110 then provides an acknowledge signal to customer premises equipment 112. After receiving the acknowledge signal, customer premises equipment 112 can initiate voice/video data transmission to customer premises equipment 118. In this manner, for example, internet protocol telephony service can be provided between customer premises equipment 112 and 118 where the connection to customer premises equipment 118 is network initiated. Thus, a call can be placed to customer premises equipment 118 even when customer premises equipment 118 does not initially have current xDSL connection to the network. Further, it should be understood that this telephony scheme can work with other types of connections, including analog modem and ISDN connections.

Figure 8:
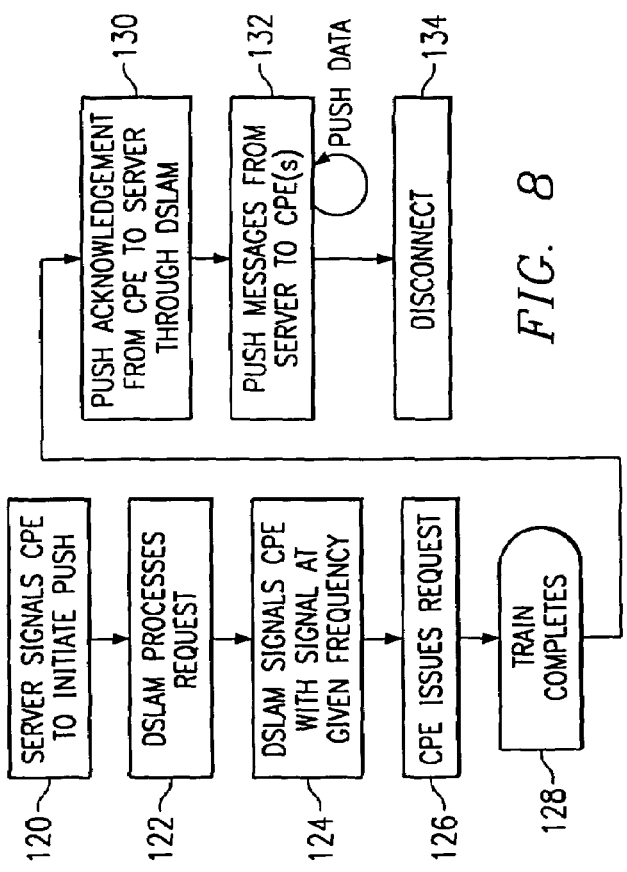
FIG. 8 is a flow chart of one embodiment of a process for a network initiated connection using special signaling.

FIG. 8 is a flow chart of one embodiment of a process for a network initiated connection using special signaling. This process can be used, for example, for push data service, as shown in FIG. 6, or for telephony services, as shown in FIG. 7. Further, other communication schemes could also be implemented using the process of FIG. 8. As shown, in step 120, a network server (or other network device) signals customer premises equipment that it wants to initiate a transfer in step 120. In step 122, a DSLAM processes the request. In step 124, the DSLAM signals the customer premises equipment with a special signal, for example, a signal at a given frequency. This informs the customer premises equipment that a push transfer has been requested.

In step 126, the customer premises equipment issues a request for xDSL service to the DSLAM. Then, in step 128, the training of that xDSL connection completes. In step 130, a push acknowledgment from the customer premises equipment is transmitted to the server across the newly established connection and through the DSLAM. In step 132, the server responds by initiating the push transfer of messages to the customer premises equipment. This pushing of data continues until the server has completed the transfer. Then, in step 134, the connection can be disconnected. In this manner, data can be pushed to customer premises equipment across a network initiated connection. The data source can be an internet information service, an internet telephony transmission or other remotely initiated communication to the customer premises equipment. Further, as mentioned above, it should be understood that this process can work with other types of connections to the customer premises equipment, including analog modem and ISDN connections.

Although the present invention has been described in detail, it should be understood that various changes, substitutions and alterations can be made thereto without departing from the sphere and scope of the invention as defined by the appended claims.

What is claimed is:

1. Loop termination equipment comprising:
    a signal generator;
    a plurality of digital subscriber line (DSL) modems; and
    a digital subscriber line access multiplexer (DSLAM) operable to couple to customer premises equipment using a local loop, the DSLAM further operable to receive a request for service from the customer premises equipment, to determine that none of the DSL modems are available to service the customer premises equipment and, in response to the determination, to control characteristics of a signal generated by the signal generator and to provide the signal to the customer premises equipment as special signaling, the signal having a frequency that does not substantially interfere with voice traffic on the local loop, and wherein the DSLAM provides the signal to the customer premises equipment as a queued request signal in response to placing the customer premises equipment in a request queue.

2. The loop termination equipment of claim 1, wherein the DSLAM provides the signal to the customer premises equipment as a busy signal in response to the request for service.

3. The loop termination equipment of claim 1, wherein the DSLAM provides another signal generated by the signal generator to the customer premises equipment as a re-issue request signal in response to retrieving the customer premises equipment from the request queue.

4. The loop termination equipment of claim 3, wherein the DSLAM is further operable to receive a second request for service from the customer premises equipment and, in response to the second request, to establish an xDSL communication link between the customer premises equipment and an available one of the DSL modems.

5. The loop termination equipment of claim 3, wherein the DSLAM is further operable to monitor for a second request for service from the customer premises equipment and, in response to failing to receive the second request, to remove the customer premises equipment from the request queue.

6. The loop termination equipment of claim 1, wherein the DSLAM is further operable to process the request queue using first-in-first-out processing.

7. The loop termination equipment of claim 1, wherein the loop termination equipment controls the frequency of the signal generated by the signal generator.

8. The loop termination equipment of claim 1, wherein the signal generator is operable to generate special signals for indicating a plurality of events, a special signal indicating a particular event based upon distinguishing characteristics of the special signal.

9. Loop termination equipment comprising:
    means for receiving a request for service from customer premises equipment;
    means for determining that none of a plurality of digital subscriber line (DSL) modems are available to service the customer premises equipment;
    means for generating a signal having a frequency that does not substantially interfere with voice traffic on a local loop; and
    means for providing the signal as special signaling across the local loop to customer premises equipment to provide a queued request signal in response to placing the customer premises equipment in a request queue.

10. The loop termination equipment of claim 9, wherein the means for providing the signal operates to provide a busy signal to the customer premises equipment.

11. The loop termination equipment of claim 9, wherein the means for providing the signal operates to provide a re-issue request signal in response to retrieving the customer premises equipment from the request queue.

* * * * *